(12) United States Patent
Thubert et al.

(10) Patent No.: US 12,213,052 B2
(45) Date of Patent: Jan. 28, 2025

(54) OBSERVING VIRTUAL CONNECTIVITY REACTIVITY UPON MOBILITY EVENTS

(71) Applicant: Cisco Technology, Inc., San Jose, CA (US)

(72) Inventors: Pascal Thubert, Roquefort les Pins (FR); Eric Levy-Abegnoli, Valbonne (FR); Jonas Zaddach, Antibes (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 426 days.

(21) Appl. No.: 17/750,229

(22) Filed: May 20, 2022

(65) Prior Publication Data

US 2023/0413156 A1 Dec. 21, 2023

(51) Int. Cl.
*H04W 40/24* (2009.01)

(52) U.S. Cl.
CPC .................. *H04W 40/248* (2013.01)

(58) Field of Classification Search
CPC .................................................. H04W 40/248
See application file for complete search history.

(56) References Cited

U.S. PATENT DOCUMENTS

| | | | |
|---|---|---|---|
| 8,036,139 B2 | 10/2011 | Kouvelas | |
| 10,313,224 B2 * | 6/2019 | Srinivasan | H04L 45/021 |
| 10,999,834 B2 | 5/2021 | Amini et al. | |
| 11,088,871 B1 * | 8/2021 | Lin | H04L 45/02 |
| 11,323,919 B1 * | 5/2022 | Parulkar | H04W 76/10 |
| 2017/0373968 A1 * | 12/2017 | Li | H04L 45/02 |
| 2018/0191603 A1 * | 7/2018 | Krattiger | H04L 45/18 |
| 2022/0060424 A1 * | 2/2022 | Snowdon | H04L 43/106 |
| 2022/0255988 A1 * | 8/2022 | Salmasi | H04W 4/029 |
| 2023/0068386 A1 * | 3/2023 | Akdeniz | G06N 3/084 |
| 2023/0353479 A1 * | 11/2023 | Qu | H04L 45/745 |

OTHER PUBLICATIONS

"Roaming on a Wireless Campus Network", University of Twente, Faculty of Electrical Engineering, Mathematics and Computer Science, Chair for Design and Analysis of Communication Systems, Aug. 14, 2010, 26 pages, I.F.R. Noppen.

Paillisse, et al., "SD-Access: Practical Experiences in Designing and Deploying Software Defined Enterprise Networks", Feb. 23, 2021, 13 pages, arXiv.

* cited by examiner

*Primary Examiner* — Jael M Ulysse
(74) *Attorney, Agent, or Firm* — BEHMKE INNOVATION GROUP LLC; James M. Behmke; James J. Wong (57) ABSTRACT

In one embodiment, an illustrative method herein may comprise: receiving, at a first edge device, a direct indication from a second edge device that a mobile device has moved from the first to the second edge device; determining, based on the direct indication, a first time at which the mobile device attached to the second edge device; receiving a network routing update message indicative of a routing update for the mobile device having moved to the second edge device; determining, based on the network routing update message, a second time at which convergence completed at the first edge device; and calculating a convergence time for the mobile device to be detected as having moved to the second edge device based on a difference between the first time and the second time.

20 Claims, 8 Drawing Sheets

OBSERVING VIRTUAL CONNECTIVITY REACTIVITY UPON MOBILITY EVENTS

TECHNICAL FIELD

The present disclosure relates generally to computer systems, and, more particularly, to observing virtual connectivity reactivity upon mobility events.

BACKGROUND

In fabric-type networks offering virtual connectivity, such as Ethernet Virtual Private Network (eVPN) or Software Defined Access (SDA) connectivity architectures, devices move ("roam") between edges (Virtual Tunnel End Point or "VTEP" in eVPN, Fabric Edges or "FE" in SDA, for instance). When that happens, sessions to/from the roaming device are interrupted until the network converges again, where the device's new location is discovered, host tables are updated, and finally routing and forwarding tables are updated.

Notably, it is very difficult to accurately measure the time it takes for the network re-converge and for running traffic to resume (i.e., "roaming time"). This roaming time, in particular, is even more difficult to measure under heavy network loads. Another challenge is determining which part of a network is a bottleneck when the roaming time becomes prohibitive.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an illustrative method herein may comprise: receiving, at a first edge device of a network, a direct indication from a second edge device of the network that a mobile device has moved from the first edge device to the second edge device; determining, by the first edge device and based on the direct indication, a first time at which the mobile device attached to the second edge device; receiving, at the first edge device, a network routing update message indicative of a routing update for the mobile device having moved to the second edge device; determining, by the first edge device and based on the network routing update message, a second time at which convergence completed at the first edge device; and calculating, by the first edge device, a convergence time for the mobile device to be detected as having moved to the second edge device based on a difference between the first time and the second time.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

Figure 1:
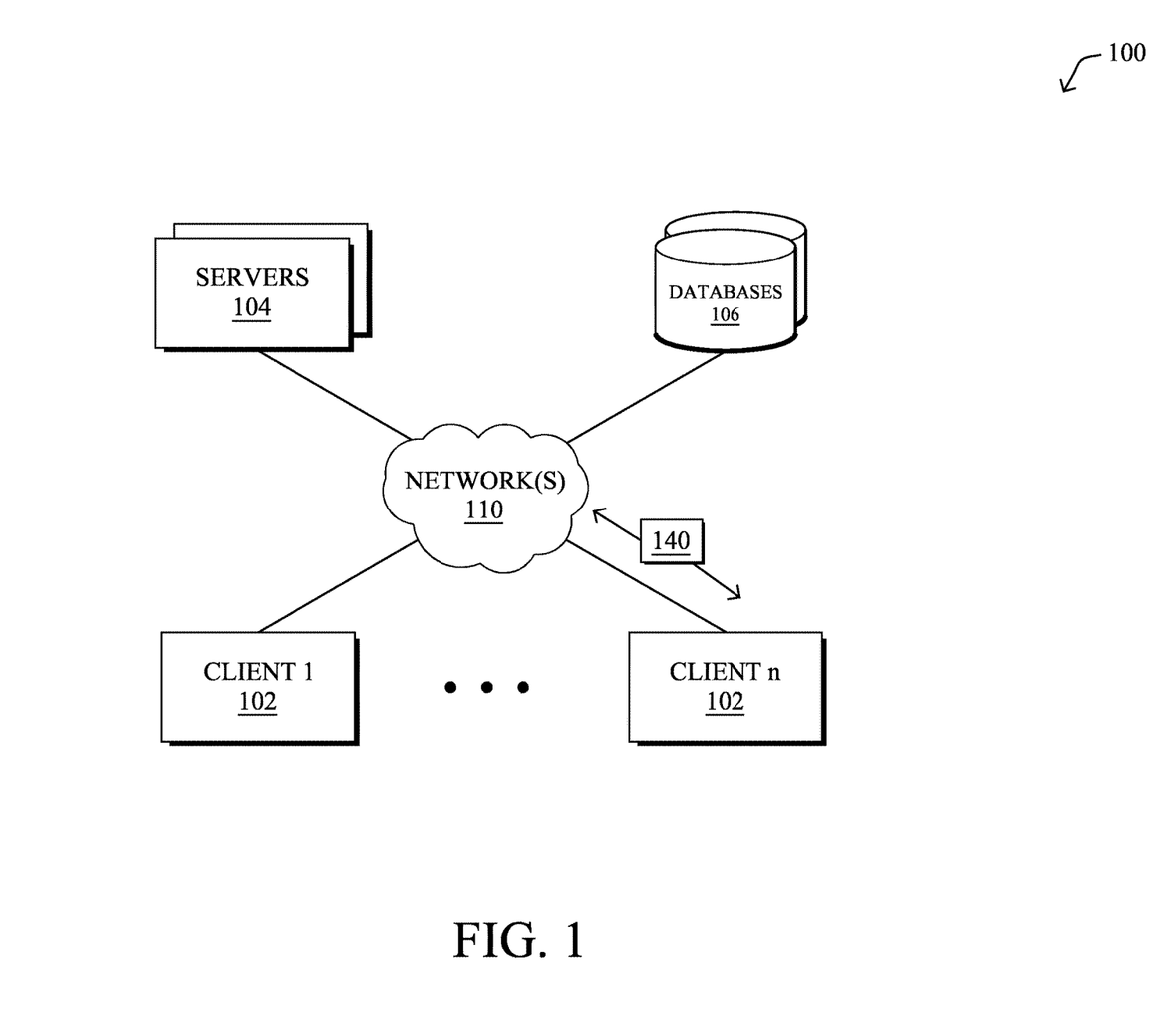
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Figure 2:
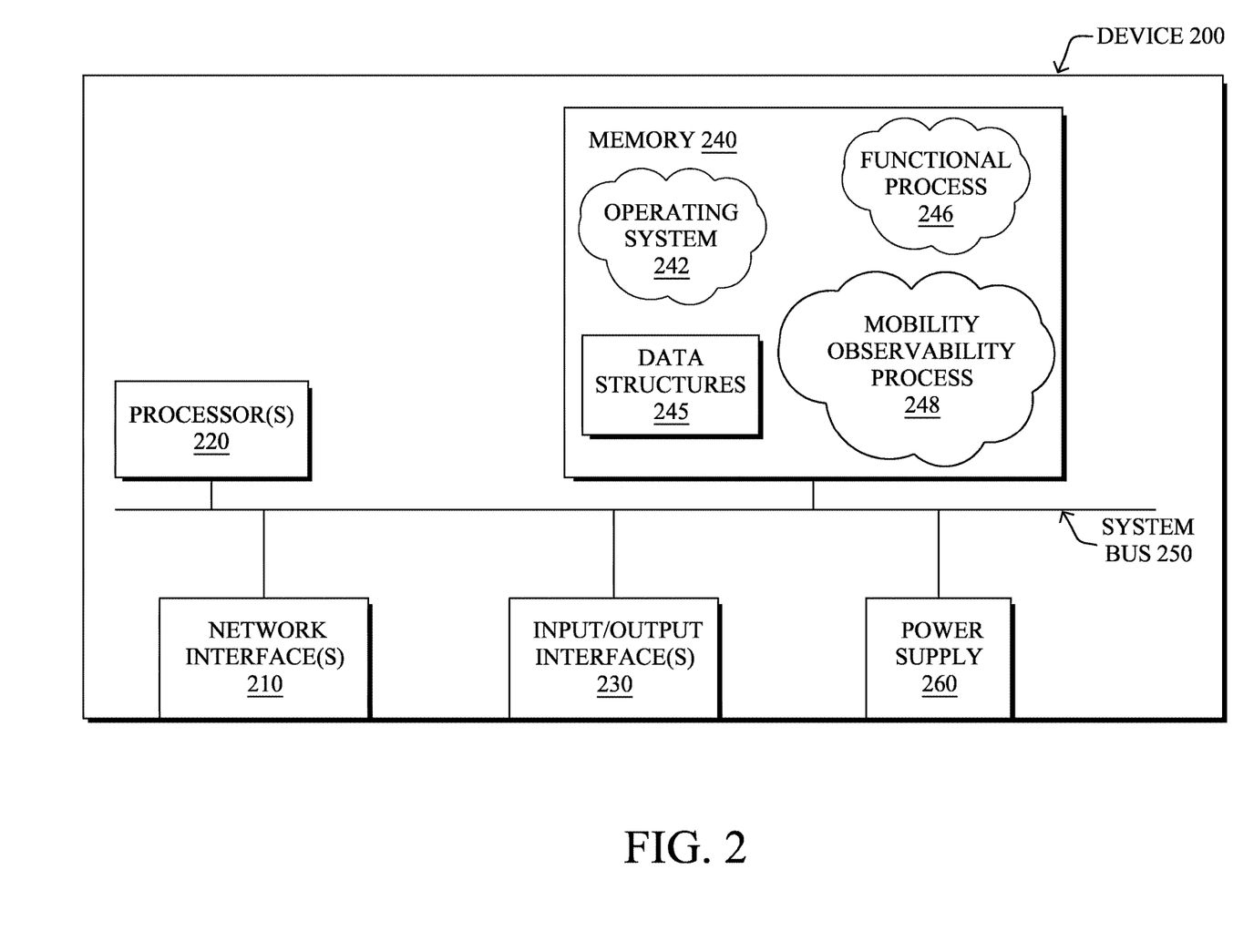
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a routing process/services 244, one or more functional processes 246, and on certain devices, an illustrative "mobility observability" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

Routing process/services 244 include computer executable instructions executed by processor 220 to perform functions provided by one or more routing protocols, such as for Interior Gateway Protocol (IGP) or Border Gateway Protocol (BGP) processing, etc., as will be understood by those skilled in the art. These functions may be configured to manage a forwarding information database including, e.g., data used to make forwarding decisions. In particular, changes in the network topology may be communicated among routers (e.g., devices 200) using routing protocols, to "converge" to an identical view of the network topology.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Virtual Connectivity Reactivity Upon Mobility Events——

Figure 3A:
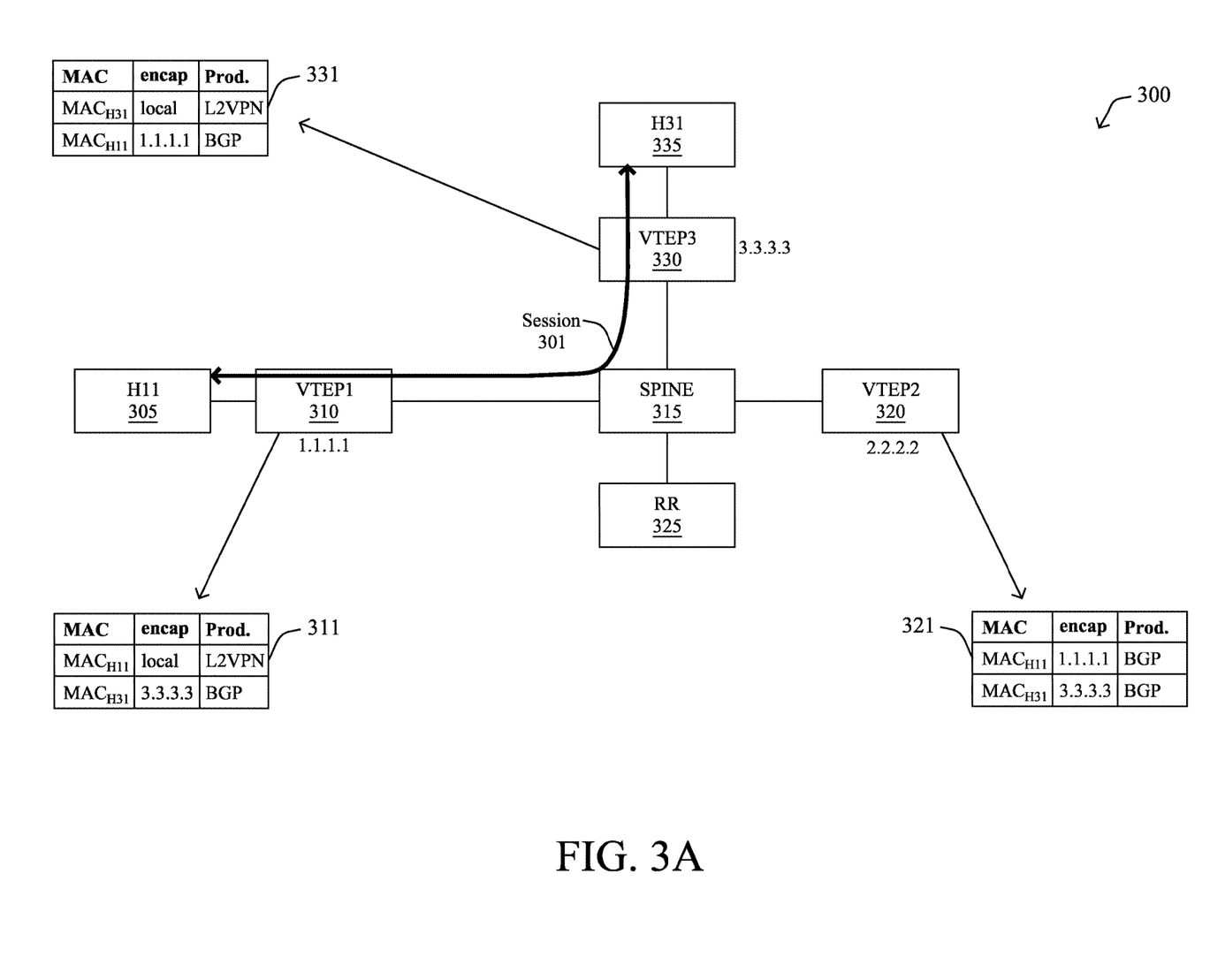
FIGS. 3A-3B illustrate an example of device roaming in a fabric-type virtual connectivity network.

As noted above, fabric-type networks such as Ethernet Virtual Private Network (eVPN) or Software Defined Access (SDA) connectivity architectures, are a specific type of computer network that offers virtual connectivity to client devices. FIG. 3A illustrates an example of a virtual connectivity network 300 (e.g., an eVPN), where, for example, a session 301 is established between end devices (hosts) "H11" and "H31" (e.g., end devices 305 and 335), where H11 is attached to an edge switch such as a Virtual Tunnel End Point (VTEP) "VTEP1" (or a Fabric Edge or "FE" in SDA), and H11 is attached to VTEP3 (e.g., VTEPs 310 and 330). (Notably, end devices may attach to the edges via other devices not shown for clarity, such as wireless access points, etc.) The session 301 thus traverses the network 300 via the VTEPs, such as through one or more spine switches 315, as will be understood by those skilled in the art. As shown, each VTEP has a corresponding L2 forwarding table 311 (for VTEP1) and 331 (for VTEP3). As shown, and as described below, the network 300 may also comprise another VTEP2 (320) with corresponding table 321, and a route reflector (RR) 325, as well as any number of other devices not shown herein for clarity.

As mentioned above, and as shown in FIG. 3B, end devices such as H11 may roam between edges (e.g., from VTEP1 to VTEP2). When that happens, sessions to/from the roaming device (e.g., session 301) are interrupted until the network converges again (as shown), where the device's new location is discovered, host tables are updated, and finally routing and forwarding tables are updated, showing that H11 is now at VTEP2 (and no longer VTEP1), accordingly.

Figure 3B:
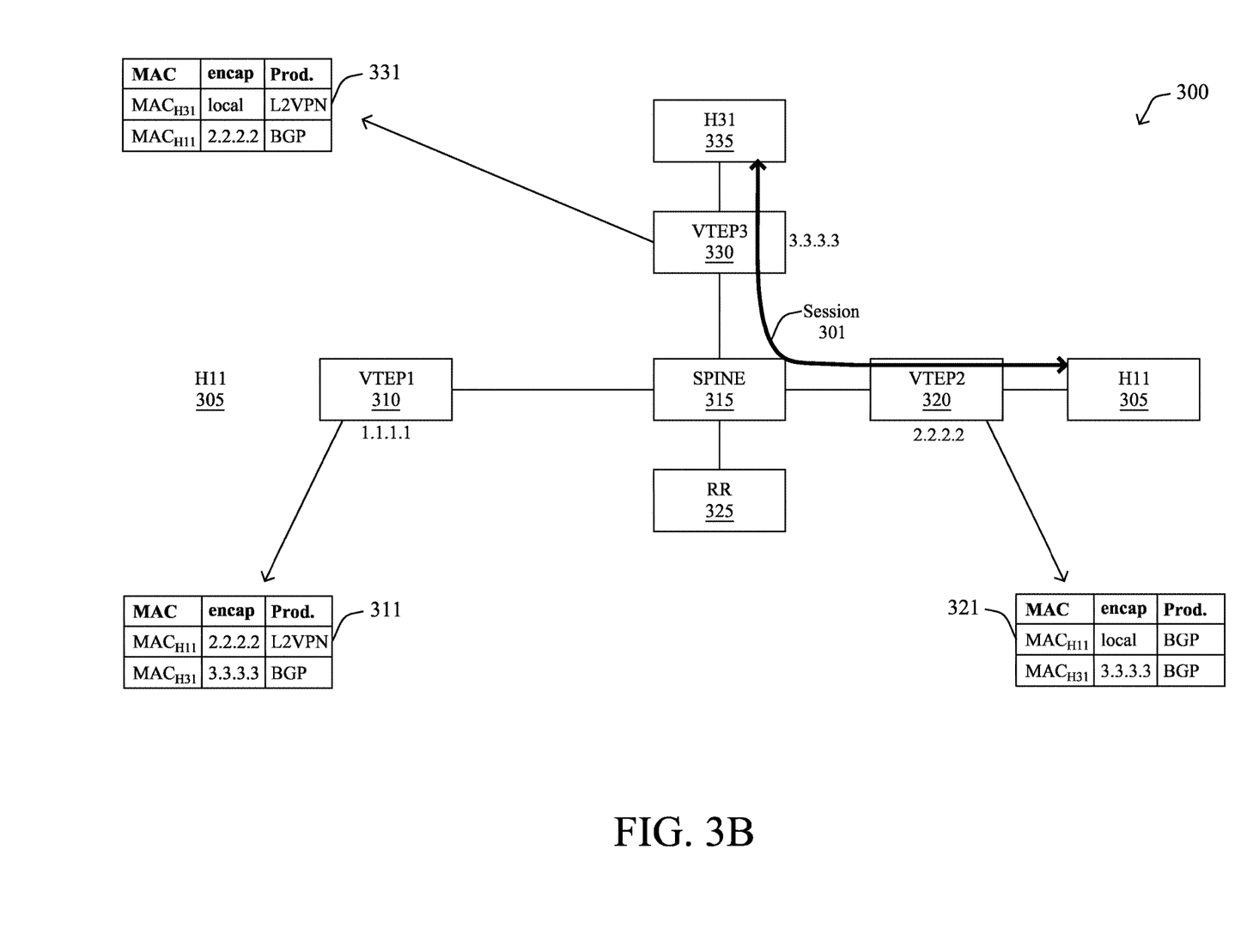

As further mentioned, it is very difficult to accurately measure the time it takes for the network re-converge and for running traffic to resume (i.e., "roaming time" between the original state of FIG. 3A when H11 begins moving to the new state shown in FIG. 3B when the network has converged on the new location of H11). Also, this roaming time is even more difficult to measure under heavy network loads, and when the roaming time becomes prohibitive, determining which part of a network is a bottleneck is particularly difficult, as well.

The techniques herein, therefore, propose a method to accurately measure roaming time in virtual connectivity (e.g., fabric-based) networks, such as eVPN, SDA, etc., as well as various enhancements, such as to "trace" bottlenecks, and so on. In particular, to measure roaming times in real time (e.g., "live") in an eVPN/SDA fabric-based network when a device (e.g., H11) roams from an old location (e.g., VTEP1) to a new location (e.g., VTEP2), the techniques herein are based generally on having the new location signal to the old location the beginning of the measurement when the device attaches in the new location, and then having the old location stop the measurement when the forwarding table is updated (e.g., receiving a message to update or actually once the network has re-converged for that entry). In addition, other parts of the network (e.g., VTEP3) can also signal to old location the update of the forwarding table, so that roaming times can be compared and bottlenecks can be located throughout the network.

Specifically, according to one or more embodiments described herein, upon a device "roaming-in" (moving to a new location), the techniques herein may send point-to-point messages to the "roaming-out" (old) location. Receipt of this message is used to measure the beginning of the roaming operation. The end of the roaming is then measured when forwarding tables are updated. Roaming time is thus the difference between the beginning and end time values. Notably, by accumulating these roaming times for each roaming device, the techniques herein can determine an average roaming time, as well as best and worst cases. Additional points of measure also allow back-tracing the point of congestion as described below, such as for when roaming time becomes prohibitive.

Figure 4A:
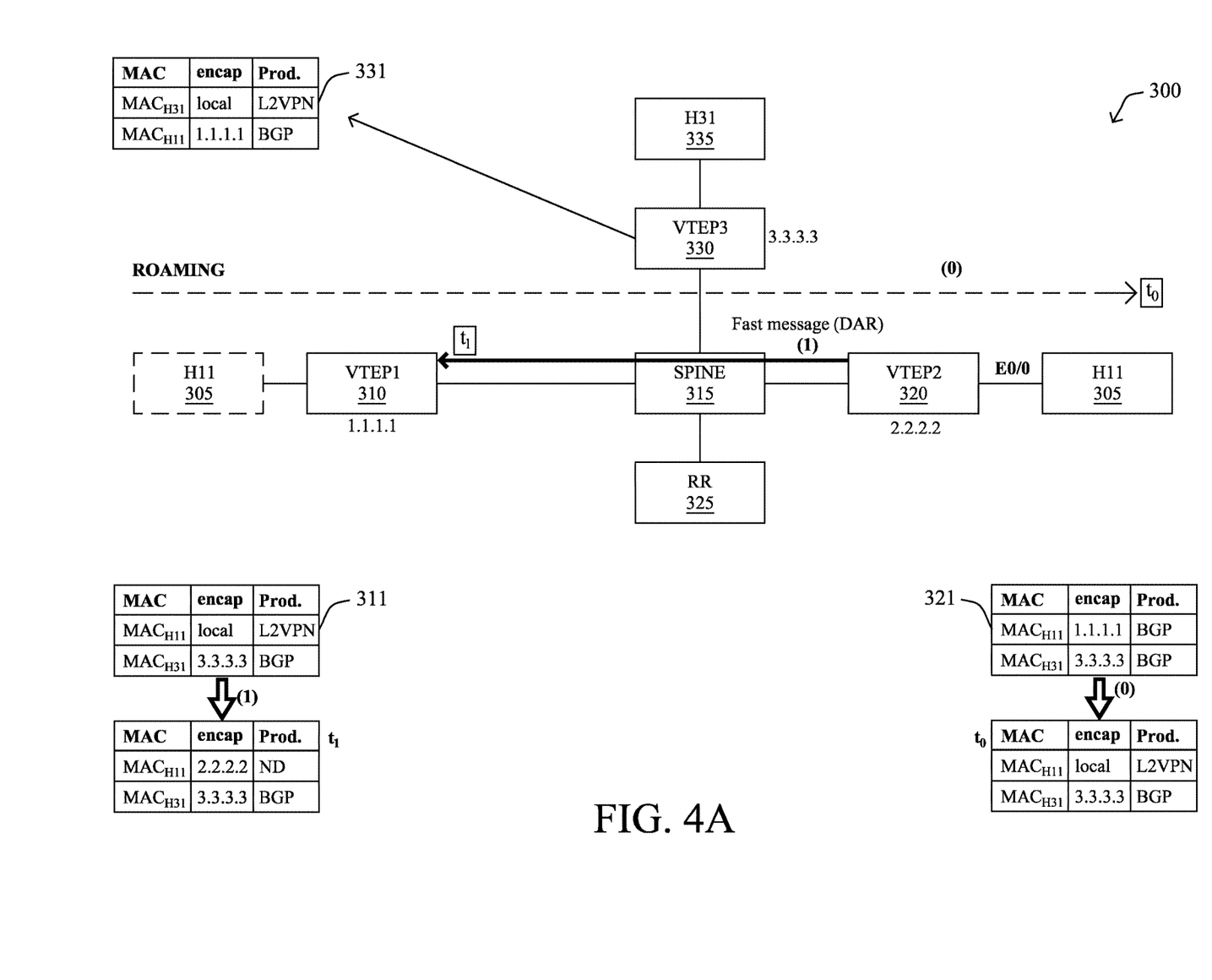
FIGS. 4A-4C illustrate an example of observing virtual connectivity reactivity upon mobility events in a fabric-type virtual connectivity network.
Figure 4B:
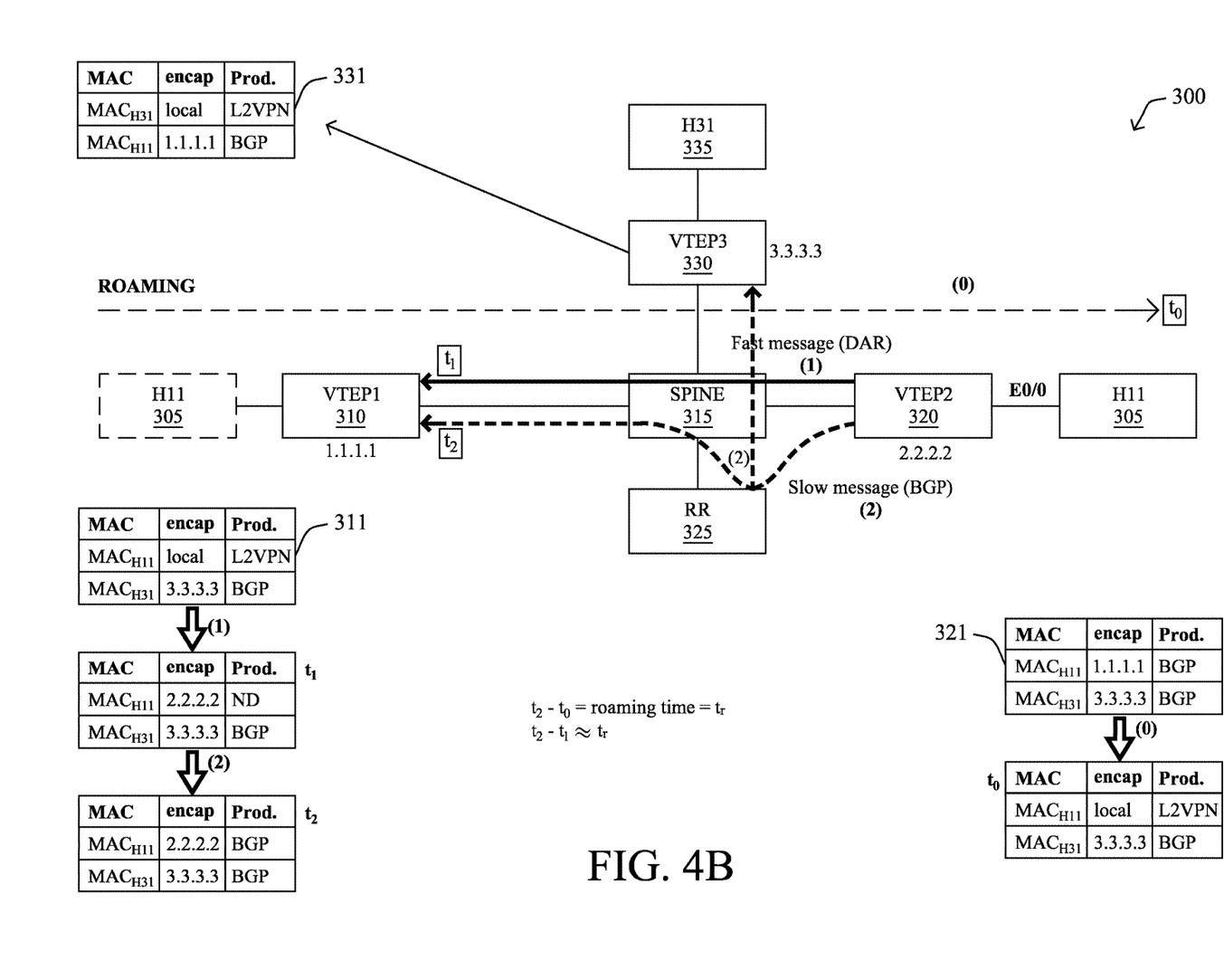
Figure 4C:
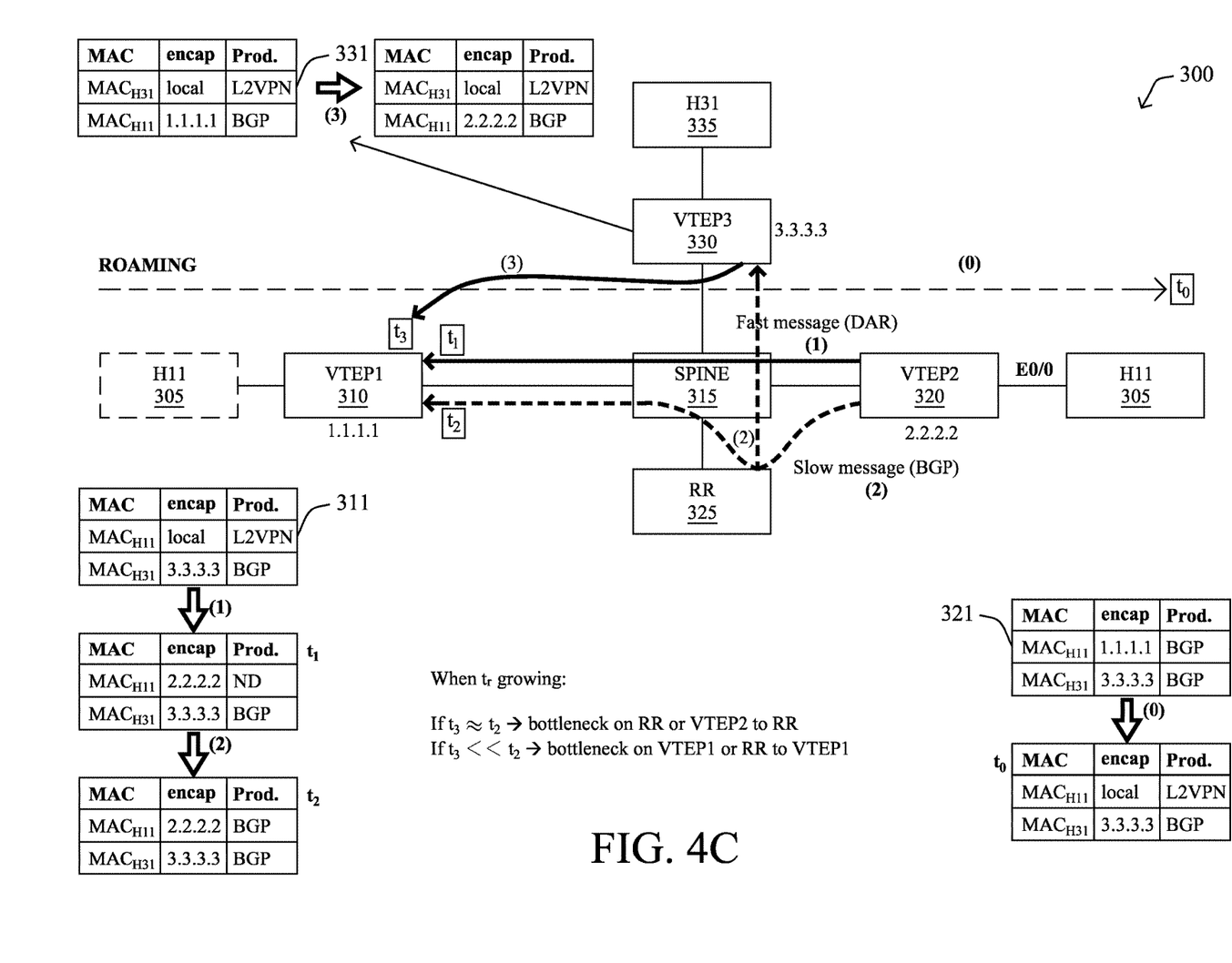

Operationally, and with reference now to FIGS. 4A-4C, which generally illustrate the stages of convergence between FIG. 3A and FIG. 3B above, the device H11 first roams from VTEP1 to VTEP2 (shown in FIG. 4A as "(0)"), and any streams (e.g., session 301 in FIG. 3A) are interrupted. In particular, at t0, after the new location for H11 is detected by VTEP2, the local routing and forwarding tables 321 are updated. Note that the time of H11 detaching from VTEP1 until re-attaching (a first "sign of life", SOL) at VTEP2 is not the responsibility of the network, and may be dependent on many external factors, and as such, need not be measured for the techniques herein.

Once attached at the new location edge (e.g., VTEP2) at t0, several control flows may then happen (e.g., generally in parallel), as described below.

First, as shown in FIG. 4A still, according to the techniques herein, a high priority message (1) is sent by the new location (e.g., VTEP2) to the old location (e.g., VTEP1) identifying the roaming device (e.g., by its media access control (MAC) address). Illustratively, this message may be sent using Internet Control Message Protocol (ICMP) transport messages (e.g., a Duplicate Address Request (DAR) message). Upon receiving the high priority DAR message (1), VTEP1 records a timestamp "t1".

In addition, as shown in FIG. 4B, a reachability update, such as BGP message (2), is sent from VTEP2 as an update to the Route Reflector (RR 325), which then relays the BGP update to all edges/VTEPs (e.g., VTEP1 and VTEP3). These updates are illustratively sent over TCP, and may be delayed due to TCP congestion, or the RR being overwhelmed. Upon receiving this BGP message (2), and in one embodiment specifically after updating routing/forwarding table 311 (as opposed to merely receiving the message), VTEP1 records a timestamp "t2".

In one embodiment, where edges are time synchronized, the roaming time, i.e., the time it took for the roaming device (e.g., H11) to have been detected by the new edge (e.g., VTEP2) and then notified to the original edge (e.g., VTEP3), may be calculated as the difference: t2-t0. As such, t0 may be carried with the DAR message (1). In most configurations, however, the time calculated as t1-t0 (the time for message (1) to be sent between edges) is negligible, so there is no need to synchronize time between edges/VTEPs, and thus values recorded only at VTEP1 are generally sufficient to determine roaming performance (i.e., according to the techniques herein, the roaming time may also simply be calculated as t2-t1). For example, in an illustrative network where the DAR message (1) may take around 20 ms, while the BGP update may take closer to 1.5 seconds, the roaming time calculated by either method would only differ by a small amount. As such, as there are benefits to not requiring time synchronization between the edge devices, or networks that simply do not synchronize (or do not synchronize well), the techniques herein may use either method, accordingly. (Note that in one embodiment, if the DAR message timing is desired for non-synchronized networks, one technique herein is to send a high-speed acknowledgment (ACK) message back to VTEP2, such that an estimated DAR message timing (t1-t0) can be computed as the round-trip transmit time of the DAR message and the ACK message divided in half.)

Additionally, roaming performance ("$t_r$") of the network may then be calculated over time as the average of the roaming time (t2-t1) across many roaming events. For instance, the average may be across a number of different devices over time, or in certain environments, there may be one such $t_r$ per each device roaming repeatedly from VTEP1 to VTEP2. In either event, it is then possible to emulate a larger number of such devices going back and forth between VTEP1 and VTEP2, for instance, than a subset of devices being observed.

Returning to FIG. 4B, other edges (e.g., VTEP3) also receive the BGP update (2) due to the roaming event of the device H11. As such, according to one or more embodiments of the techniques herein, and as shown in FIG. 4C, upon receiving the BGP update at an edge that is not the original edge (e.g., VTEP3), that edge may then send its own high priority message (e.g., DAR) to the old location VTEP1, message (3). Upon receiving this message (3), the original location VTEP1 may further records a timestamp "t3" (e.g., generally indicative of when the other VTEP, such as VTEP3, performed its forwarding table update). Note that there will be as many t3s as edges/VTEPs minus two, namely, all edges of the network 300 minus the original location edge and the new location edge. (Also of note, it is possible that some t3 may occur before t2.) From this information, the original location edge (e.g., VTEP1) is able to make a number of additional insights into network convergence behavior, accordingly.

In particular, if over a period of time (e.g., with N devices roaming/second), it is noticed that there are some timeframes where the average roaming time had become prohibitive (compared to the total average, compared to a configured/determined threshold among roaming times generally, grown rapidly, or other trigger for a "high" or otherwise anomalous roaming time), the techniques herein may use this t3 time for identifying potential causes of any bottlenecks that may be the culprit. That is, when such an incident occurs, the computation (e.g., average) of t2-t3 allow the techniques herein to determine which network segment is congested.

Specifically, if t3 is close to t2, it implies that the route reflector (RR) did not get the update in time, and the congestion is before the RR (VTEP2 to RR), or that the RR is overwhelmed. If, however, t3 is much smaller than t2, then it implies that the network segment from the RR to VTEP1 is congested, or VTEP1 is overwhelmed. (Moreover, if t3 is much larger than t2, it could also imply that VTEP3 is overwhelmed or that the segment from the RR to VTEP3 is congested.)

Note that other determinations may be made herein as well. For example, by comparing t2 times among other network end points and/or from multiple route reflectors, the techniques herein may be able to perform anomaly detection (e.g., and mitigation). For example, assume that an average network with two hundred devices roaming every seconds has an average roaming time that may range between 200 ms and 1 second. If this network, or another network with similar parameters, has a roaming time or average roaming time calculated outside of this range (e.g., 5 seconds), then this time may be flagged as anomalous, and mitigation actions may be taken (e.g., notifications, adjustments, resource re-allocation, etc.). For example, various behavioral analytics engines or other management tools may be used to record information over time to track "live" roaming performances of a system, and may detect (and react to) issues in real time.

In addition, by monitoring the behavior of any visible/observed streams into and/or out of any given edge/VTEP, other insights may also be possible herein. For instance, certain of the times above may be calculated or enhanced based on when traffic starts and/or stops flowing according to convergence occurring within various locations of the network (and the amount of data that is lost in-between). In one embodiment, the techniques herein may calculate a time difference between when flows received for the roaming device (e.g., H11) stop being received at the original edge VTEP1, versus when the routing update message is received at VTEP1 (and optionally computing how much traffic was actually received before the update/convergence, i.e., lost traffic).

Figure 5:
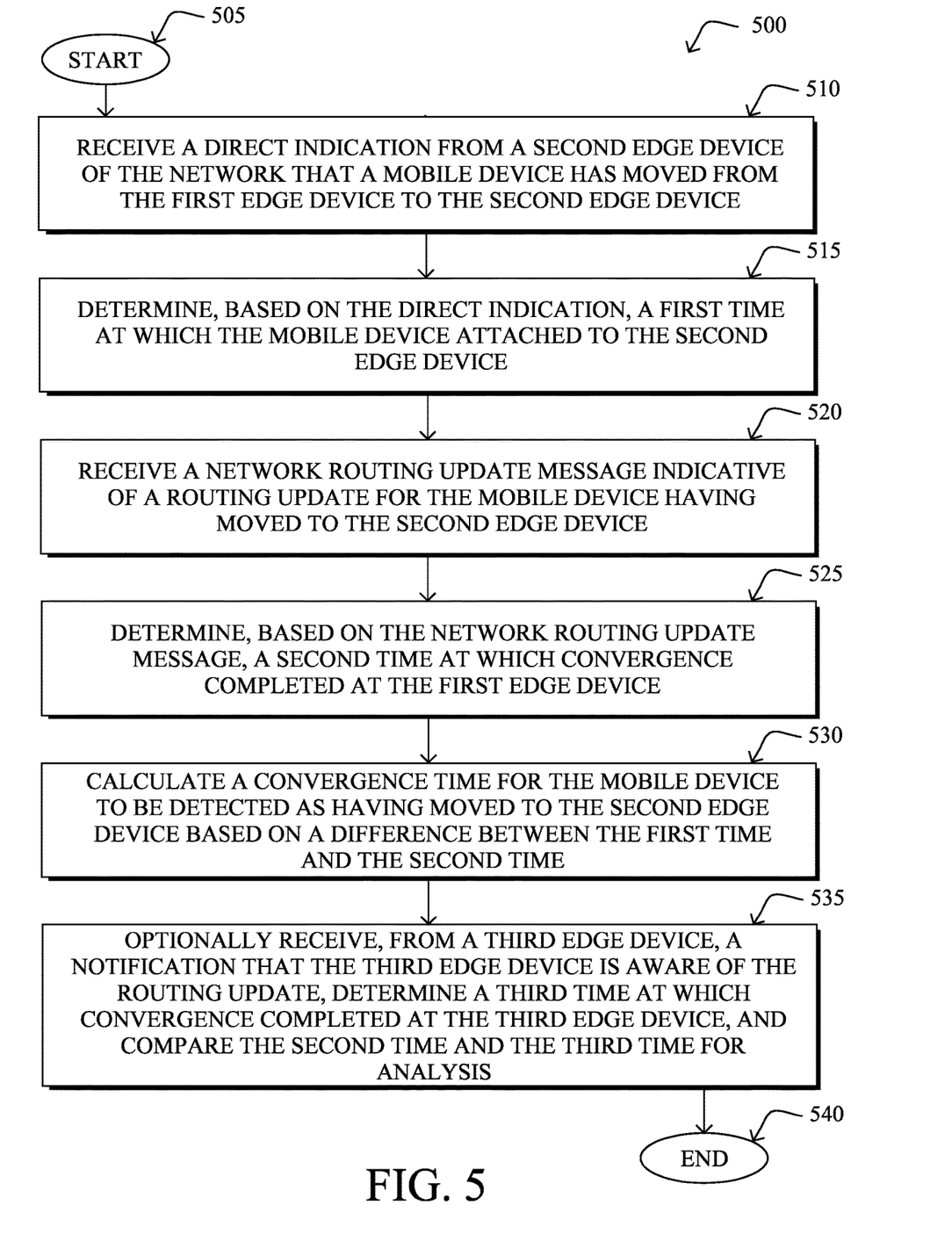
FIG. 5 illustrates an example simplified procedure for in accordance with one or more embodiments described herein.

In closing, FIG. 5 illustrates an example simplified procedure 500 for observing virtual connectivity reactivity upon mobility events in accordance with one or more embodiments described herein. For example, a non-generic, specifically configured device (e.g., device 200, particularly an edge device/switch, such as a VTEP or FE above) may perform procedure 500 by executing stored instructions (e.g., process 248). The procedure 500 may start at step 505, and continues to step 510, where, as described in greater detail above, a first edge device of a network (e.g., VTEP1) receives a direct indication (e.g., ICMP DAR (1)) from a second edge device of the network (e.g., VTEP2) that a mobile device (e.g., H11) has moved from the first edge device to the second edge device.

In step 515, the first edge device determines, based on the direct indication, a first time at which the mobile device attached to the second edge device. For example, as described above, this is based on either extracting the first time t0 from the direct indication as inserted by the second edge device (in a synchronized network), or based on a receipt time t1 of the direct indication.

In step 520, the first edge device receives a network routing update message (e.g., BGP message (2)) indicative of a routing update for the mobile device having moved to the second edge device, and can then determine, in step 525 based on the network routing update message, a second time t2 at which convergence completed at the first edge device. As noted above, the second time may be based on a receipt time of the network routing update message, or else based on a completed update of a local forwarding table in response to the network routing update message.

In step 530, the first edge device may then calculate a convergence time (e.g., roaming time) for the mobile device to be detected as having moved to the second edge device based on a difference between the first time and the second time (e.g., either t2–t1 or t2–t0).

Optionally, in certain embodiments herein, in step 535, the first edge device may i) receive, from a third edge device of the network, a notification that the third edge device is aware of the routing update for the mobile device having moved to the second edge device, ii) determine, based on the notification, a third time at which convergence completed at the third edge device, and iii) compare the second time and the third time for analysis. For example, as described in greater detail above, an analysis having the second time and the third time being substantially similar implies an issue corresponds to communication between the second edge device and a routing update route reflector. Conversely, an analysis having the third time being substantially less than the second time implies an issue corresponds to communication between a routing update route reflector and the first edge device.

The simplified procedure 500 may then end in step 540, notably with the ability to continue detecting mobility events, calculating the associated roaming times, performing analysis, and so on. Other steps may also be included generally within procedure 500. For example, such steps (or, more generally, such additions to steps already specifically illustrated above), may include: comparing a plurality of convergence times for analysis (and detecting and mitigating an anomaly based on the analysis); replying an acknowledgment to the direct indication, and receiving, from the second edge device, a round trip time associated with the direct indication and the acknowledgment, wherein calculating the convergence time is the difference between the first time and the second time plus half of the round trip time; determining a time of stoppage of a data flow associated with the mobile device, and determining an impact of the convergence time on the data flow based on the time of stoppage; and so on.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for observing virtual connectivity reactivity upon mobility events. In particular, the techniques herein may be used in any fabric-based networking architectures, such as eVPN, SDA, etc., to track roaming performances and identify bottlenecks, watch for trends, find anomalies, etc. The techniques herein may also be used for assurance and testing for any mobility event that affects routes to ensure that the network operates according to plan (e.g., stabilizing/converging as expected). Other techniques for measuring the impact of mobility events have been focused on resource-intensive and poorly scalable methods for determining a duration of stream interruption, performing after-the-fact log-based examination (e.g., limited to time-synchronized networks), and so on, however, none of the currently available methods accurately measure, in real time, how long roaming takes from start to finish in fabric-type virtual connectivity networks, nor do they provide sufficient clarity and/or coordination to allow enhanced analysis and troubleshooting as described herein.

Illustratively, the techniques described herein may be performed by hardware, software, and/or firmware, such as in accordance with the illustrative mobility observability process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: receiving, at a first edge device of a network, a direct indication from a second edge device of the network that a mobile device has moved from the first edge device to the second edge device; determining, by the first edge device and based on the direct indication, a first time at which the mobile device attached to the second edge device; receiving, at the first edge device, a network routing update message indicative of a routing update for the mobile device having moved to the second edge device; determining, by the first edge device and based on the network routing update message, a second time at which convergence completed at the first edge device; and calculating, by the first edge device, a convergence time for the mobile device to be detected as having moved to the second edge device based on a difference between the first time and the second time.

In one embodiment, the first edge device comprises a Virtual Tunnel End Point in an Ethernet Virtual Private Network.

In one embodiment, the first edge device comprises a Fabric Edge in a Software Defined Access network.

In one embodiment, the direct indication comprises an Internet Control Message Protocol Duplicate Address Request message.

In one embodiment, determining the first time is based on extracting the first time from the direct indication as inserted by the second edge device in a synchronized network.

In one embodiment, determining the first time is based on a receipt time of the direct indication.

In one embodiment, the network routing update message is a Border Gateway Protocol message.

In one embodiment, determining the second time is based on a receipt time of the network routing update message.

In one embodiment, determining the second time is based on a completed update of a local forwarding table in response to the network routing update message.

In one embodiment, the method further comprises: receiving, from a third edge device of the network, a notification that the third edge device is aware of the routing update for the mobile device having moved to the second edge device; determining, based on the notification, a third time at which convergence completed at the third edge device; and comparing the second time and the third time for analysis. In one embodiment, an analysis having the second time and the third time being substantially similar implies an issue corresponds to communication between the second edge device and a routing update route reflector. In one embodiment, an analysis having the third time being substantially less than the second time implies an issue corresponds to communication between a routing update route reflector and the first edge device.

In one embodiment, the method further comprises: comparing a plurality of convergence times for analysis. In one embodiment, the method further comprises: detecting an anomaly based on the analysis; and mitigating the anomaly.

In one embodiment, the method further comprises: replying an acknowledgment to the direct indication; and receiving, from the second edge device, a round trip time associated with the direct indication and the acknowledgment, wherein calculating the convergence time is the difference between the first time and the second time plus half of the round trip time.

In one embodiment, the method further comprises: determining a time of stoppage of a data flow associated with the mobile device; and determining an impact of the convergence time on the data flow based on the time of stoppage.

According to the embodiments herein, an illustrative tangible, non-transitory, computer-readable medium herein may have computer-executable instructions stored thereon that, when executed by a processor on a computer, may cause the computer to perform a method comprising: receiving, as a first edge device of a network, a direct indication from a second edge device of the network that a mobile device has moved from the first edge device to the second edge device; determining, based on the direct indication, a first time at which the mobile device attached to the second edge device; receiving a network routing update message indicative of a routing update for the mobile device having moved to the second edge device; determining, based on the network routing update message, a second time at which convergence completed at the first edge device; and calculating a convergence time for the mobile device to be detected as having moved to the second edge device based on a difference between the first time and the second time. In one embodiment, the method further comprises: receiving, from a third edge device of the network, a notification that the third edge device is aware of the routing update for the mobile device having moved to the second edge device; determining, based on the notification, a third time at which convergence completed at the third edge device; and comparing the second time and the third time for analysis. In one embodiment, a first analysis having the second time and the third time being substantially similar implies a first issue corresponds to communication between the second edge device and a routing update route reflector, and a second analysis having the third time being substantially less than the second time implies a second issue corresponds to communication between a routing update route reflector and the first edge device.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: receive, as a first edge device of a network, a direct indication from a second edge device of the network that a mobile device has moved from the first edge device to the second edge device; determine, based on the direct indication, a first time at which the mobile device attached to the second edge device; receive a network routing update message indicative of a routing update for the mobile device having moved to the second edge device; determine, based on the network routing update message, a second time at which convergence completed at the first edge device; and calculate a convergence time for the mobile device to be detected as having moved to the second edge device based on a difference between the first time and the second time.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
 receiving, at a first edge device of a network, a direct indication from a second edge device of the network that a mobile device has moved from the first edge device to the second edge device;
 determining, by the first edge device and based on the direct indication, a first time at which the mobile device attached to the second edge device;
 receiving, at the first edge device, a network routing update message indicative of a routing update for the mobile device having moved to the second edge device;
 determining, by the first edge device and based on the network routing update message, a second time at which convergence completed at the first edge device; and
 calculating, by the first edge device, a convergence time for the mobile device to be detected as having moved to the second edge device based on a difference between the first time and the second time.

2. The method as in claim 1, wherein the first edge device comprises a Virtual Tunnel End Point in an Ethernet Virtual Private Network.

3. The method as in claim 1, wherein the first edge device comprises a Fabric Edge in a Software Defined Access network.

4. The method as in claim 1, wherein the direct indication comprises an Internet Control Message Protocol Duplicate Address Request message.

5. The method as in claim 1, wherein determining the first time is based on extracting the first time from the direct indication as inserted by the second edge device in a synchronized network.

6. The method as in claim 1, wherein determining the first time is based on a receipt time of the direct indication.

7. The method as in claim 1, wherein the network routing update message is a Border Gateway Protocol message.

8. The method as in claim 1, wherein determining the second time is based on a receipt time of the network routing update message.

9. The method as in claim 1, wherein determining the second time is based on a completed update of a local forwarding table in response to the network routing update message.

10. The method as in claim 1, further comprising:
 receiving, from a third edge device of the network, a notification that the third edge device is aware of the routing update for the mobile device having moved to the second edge device;
 determining, based on the notification, a third time at which convergence completed at the third edge device; and
 comparing the second time and the third time for analysis.

11. The method as in claim 10, wherein an analysis having the second time and the third time being substantially similar implies an issue corresponds to communication between the second edge device and a routing update route reflector.

12. The method as in claim 10, wherein an analysis having the third time being substantially less than the second time implies an issue corresponds to communication between a routing update route reflector and the first edge device.

13. The method as in claim 1, further comprising:
comparing a plurality of convergence times for analysis.

14. The method as in claim 13, further comprising:
detecting an anomaly based on the analysis; and
mitigating the anomaly.

15. The method as in claim 1, further comprising:
replying an acknowledgment to the direct indication; and
receiving, from the second edge device, a round trip time associated with the direct indication and the acknowledgment, wherein calculating the convergence time is the difference between the first time and the second time plus half of the round trip time.

16. The method as in claim 1, further comprising:
determining a time of stoppage of a data flow associated with the mobile device; and
determining an impact of the convergence time on the data flow based on the time of stoppage.

17. A tangible, non-transitory, computer-readable medium having computer-executable instructions stored thereon that, when executed by a processor on a computer, cause the computer to perform a method comprising:
receiving, as a first edge device of a network, a direct indication from a second edge device of the network that a mobile device has moved from the first edge device to the second edge device;
determining, based on the direct indication, a first time at which the mobile device attached to the second edge device;
receiving a network routing update message indicative of a routing update for the mobile device having moved to the second edge device;
determining, based on the network routing update message, a second time at which convergence completed at the first edge device; and
calculating a convergence time for the mobile device to be detected as having moved to the second edge device based on a difference between the first time and the second time.

18. The tangible, non-transitory, computer-readable medium as in claim 17, wherein the method further comprises:
receiving, from a third edge device of the network, a notification that the third edge device is aware of the routing update for the mobile device having moved to the second edge device;
determining, based on the notification, a third time at which convergence completed at the third edge device; and
comparing the second time and the third time for analysis.

19. The tangible, non-transitory, computer-readable medium as in claim 18, wherein a first analysis having the second time and the third time being substantially similar implies a first issue corresponds to communication between the second edge device and a routing update route reflector, and wherein a second analysis having the third time being substantially less than the second time implies a second issue corresponds to communication between a routing update route reflector and the first edge device.

20. An apparatus, comprising:
one or more network interfaces to communicate with a network;
a processor coupled to the one or more network interfaces and configured to execute one or more processes; and
a memory configured to store a process that is executable by the processor, the process, when executed, configured to:
receive, as a first edge device of a network, a direct indication from a second edge device of the network that a mobile device has moved from the first edge device to the second edge device;
determine, based on the direct indication, a first time at which the mobile device attached to the second edge device;
receive a network routing update message indicative of a routing update for the mobile device having moved to the second edge device;
determine, based on the network routing update message, a second time at which convergence completed at the first edge device; and
calculate a convergence time for the mobile device to be detected as having moved to the second edge device based on a difference between the first time and the second time.

* * * * *